United States Patent
Kueper et al.

[11] Patent Number: 6,113,864
[45] Date of Patent: Sep. 5, 2000

[54] ADSORBER-CATALYST COMBINATION FOR INTERNAL COMBUSTION ENGINES

[75] Inventors: Paul Kueper, Wiernsheim; Wulf Sebbesse, Munich; Roland Huss, Esslingen; Alf Degen, Friolzheim, all of Germany

[73] Assignees: Dr. Ing. h.c.F. Porsche AG, Weissach; Bayerische Motoren Werke Aktiengesellschaft, Munich; DaimlerChrysler AG, Stuttgart; Volkswagen Aktiengesellschaft, Wolfsburg, all of Germany

[21] Appl. No.: 09/045,699

[22] Filed: Mar. 23, 1998

[30] Foreign Application Priority Data

Mar. 22, 1997 [DE] Germany .............. 197 12 087

[51] Int. Cl.⁷ .................................................. B01D 53/34
[52] U.S. Cl. ..................... 422/180; 422/171; 422/177; 60/297; 29/890
[58] Field of Search ................... 422/171, 180, 422/211, 222; 60/297, 299; 29/890

[56] References Cited

FOREIGN PATENT DOCUMENTS

| | | |
|---|---|---|
| 0 485 179 | 5/1992 | European Pat. Off. . |
| 0 616 115 | 9/1994 | European Pat. Off. . |
| 0 661 098 | 7/1995 | European Pat. Off. . |
| 43 14 043 | 11/1994 | Germany . |
| 195 43 219 | 12/1996 | Germany . |
| 4-141219 | 5/1992 | Japan . |
| 6-185342 | 7/1994 | Japan . |

OTHER PUBLICATIONS

Bob R. Powell and Shell E. Whittington, "Encapsulation: A New Mechanism of Catalyst Deactivation", Journal of Molecular Analysis, 1983, pp. 297–299.

*Primary Examiner*—Hien Tran
*Attorney, Agent, or Firm*—Evenson, McKeown, Edwards & Lenahan, P.L.L.C.

[57] ABSTRACT

A combination of an adsorbent with a catalyst for internal combustion engines. The adsorbent-catalyst combination is built up in two or more alternating layers of zones, which are coated to be adsorbing, and zones, which are coated to have catalytic activity, and are connected in series in relation to the flow of exhaust gas. The zones having adsorbing activity are to be designed thermodynamically so that they have a lesser heat transfer than the zones having catalytic activity, so that the zones having catalytic activity have a higher support temperature than the upstream zones having adsorbing activity.

17 Claims, 3 Drawing Sheets

ADSORBER-CATALYST COMBINATION FOR INTERNAL COMBUSTION ENGINES

BACKGROUND AND SUMMARY OF THE INVENTION

This application claims the priority of German patent document 197 12 087.3, filed Mar. 22, 1997, the disclosure of which is expressly incorporated by reference herein.

The invention relates to a combination of an adsorbent with a catalyst for internal combustion engines.

Catalysts, as well as adsorbents, are being used increasingly for detoxifying exhaust gases from internal combustion engines, in order to avoid emissions after the cold start of the internal combustion engine, that is, when the catalyst has not yet reached its operating temperature. These adsorbents or catalysts are ceramic or metal supports with a honeycomb structure, which have been coated appropriately. After the cold start of the internal combustion engine, the adsorbent is intended to adsorb certain components of the exhaust gas here, especially hydrocarbons or $NO_x$, and to store them until the downstream catalyst has reached its operating temperature. In this connection, the problem arises that the desorption temperature of the adsorbent, that is, the temperature above which the adsorbent emits the adsorbed components of the exhaust gas once again, must be higher or at least equal to the temperature at which the conversion of said exhaust gas components commences in the catalyst (light-off temperature).

Moreover, it has become known, for example, from B. R. Powell, S. E. Whittington: "Encapsulation: A new mechanism of catalyst deactivation", Physical Department, GM Research Lab., Warren, Mich., U.S.A., in: J. Catal. 1983, that a coating of zeolites (adsorbing action), coated with noble gas (catalytic action), used in the exhaust gas stream, loses its effectiveness at high temperatures between 930° C. and 1000° C., because the noble metal particles sink into the silica surface present in the zeolite. A silica bead is formed here around the base of the noble metal particle, encapsulating it, so that the effective surface area of the noble metal particle is drastically reduced. It follows from this that a coating, which is formed jointly from zeolites and noble metal particles, is not capable of functioning permanently.

Coatings for adsorbents and catalysts have become known, for which the desorption temperature of the adsorbing coating lies within the range of the light-off temperature of the catalytically active coating.

It is an object of the invention to provide an adsorbent-catalyst combination, which is optimized with respect to its storage and conversion behavior.

This and other objects have been achieved by providing an adsorbent-catalyst combination for an internal combustion engine, comprising at least one adsorbing zone of an adsorbing material and at least one catalytic zone of a catalytic material, said adsorbing zones being arranged alternately with said catalytic zones in an exhaust gas stream.

This and other objects have also been achieved by providing an adsorbent-catalyst combination for an internal combustion engine, comprising: a housing defining a flow path to be communicated with an exhaust stream of the internal combustion engine; at least one adsorber arranged in said housing; and at least one catalyst arranged in said housing, said at least one adsorber and said at one catalyst being arranged alternately along said flow path.

This and other objects have also been achieved by providing a method of manufacturing an adsorbent-catalyst combination for an internal combustion engine, comprising: providing a housing defining a flow path to be communicated with an exhaust stream of the internal combustion engine; providing at least one adsorber; providing at least one catalyst; and arranging said at least one adsorber and said at one catalyst alternately along said flow path of the housing.

According to the invention, it is proposed for this purpose that the adsorbent-catalyst combination is built up in alternating layers of adsorbing and catalytically coated zones, which are connected in series with respect to the exhaust gas stream. By separating the adsorbing and catalyzing zones, a mutual effect of the materials used here is precluded; an integral coating of adsorbing material and of material with catalyzing activity is reproduced roughly in that a division is made into regions, which are coated only with adsorbing materials and regions, which are coated only with catalyzing materials. In other words, steps of an adsorbing region and a downstream region of catalytic activity are linked together.

It is particularly advantageous if the downstream regions of catalytic activity become active before or insignificantly after the desorption of the upstream adsorbing region commences. Without further measures, however, the upstream, adsorbing region acts as a heat sink and therefore heats up more rapidly than does the subsequent downstream region of catalytic activity. Moreover, the subsequent downstream region of catalytic activity attains its effectiveness (light-off temperature) clearly later than in a system without the proposed upstream, adsorbing region.

Since the desorption temperature of the upstream, adsorbing region lies in the region of the light-off temperature of the subsequent downstream region of catalytic activity, the desorption commences although the subsequent region of catalytic activity is not yet effective. The desorbed materials are therefore not converted in the region of catalytic activity. In addition, as described above, since the region of catalytic activity attains its effectiveness later than it would in a system without a preceding adsorbing region, the total emission is higher than it would be in a strictly catalytic system without a preceding adsorbing region.

It is therefore proposed that the system of adsorbing regions and of regions of catalytic activity be formed in such a manner geometrically and from a material point of view that;

a) there is a large temperature difference between the exhaust gas and a support material in the region of adsorbing activity;

b) a small temperature difference between the exhaust gas and the support material in the region of catalytic activity; and c) a small temperature difference between the inlet temperature and the outlet temperature in the region of adsorbing activity.

This achieves, at least in the inlet region of the region of catalytic activity or in the whole region of catalytic activity, that the temperature of the support material is higher than the temperature in the outlet region of the upstream adsorbing region or in the whole of the upstream adsorbing region. Accordingly, the region of catalytic activity can reach its light-off temperature before the start of the desorption in the adsorbing region, even if the desorption temperature is somewhat lower than the light-off temperature.

With this design, the effectiveness of the region of catalytic activity sets in before the desorption process in the adsorbing region commences. Passage of hydrocarbons through such an adsorbent-catalyst combination can therefore be reduced significantly or prevented completely.

With the proposed formation of the adsorbent-catalyst combination, effective purification of the exhaust gas after a cold start of the internal combustion engine is possible, without the need for additional heating systems, such as electrical heating or a burner, for this purpose.

Beyond the use in the present adsorbent-catalyst combination, the proposed formation can also be used advantageously when a catalyst is connected downstream from a different system. This is particularly the case in systems, with an adsorbent coating having catalytic activity (integral coating) and a downstream catalyst, as well as in systems with a known arrangement of a support, coated only with adsorbing material and having a downstream catalyst.

In order to attain this objective, it is proposed that zones with adsorbing activity be designed thermodynamically in such a manner that, compared to the zone with catalytic activity, they have a lower heat transfer or a higher heat capacity or both. This can be accomplished, for example by one or several of the following measures for the design of the geometry and material of the adsorbing zones: a larger wall thickness, a lower cell density, a higher heat capacity, a higher specific heat capacity, a higher density of the support material, a lower surface area or no decreased surface or a decreased surface structure (smooth surface). On the other hand, for the design of the geometry and material of the zones having catalytic activity, the following opposite measures can be employed: a lesser wall thickness, a higher cell density, a lower heat capacity, a lower specific heat capacity, a lower density of the support material, a larger surface area or a larger surface structure (rough surface, flow interruptions, flow faults, flow deflections). The advantage, achieved herewith, lies in the smaller difference between the temperature of the exhaust gas and that of the zones of catalytic activity than between the temperature of the exhaust gas and that of the zones of adsorbent activity. This smaller difference makes it possible to have higher temperatures in the inlet region of a zone, which has catalytic activity and is downstream from an adsorbing zone, than in the outlet region of the adsorbing zone.

In additional, fundamental considerations of the present adsorbent-catalyst combination, it was recognized that a rapid rise in the temperature of the adsorbent-catalyst combination brings about a rapid attainment of the light-off temperature of the region of catalytic activity and, with that, a short time, in which the hydrocarbons must be adsorbed. A shortening of the heating time of the region having catalytic activity up to the light-off temperature thus enables the volume of the adsorbing region to be reduced.

A measure of the heating rate, that is, of the amount of heat that can be adsorbed in unit time, is given by the product of the thermal conductivity, the density and the heat capacity of the support used. The higher this product, the more heat can be adsorbed by a given support in the same time for the same increase in temperature. Knowing this relationship, the rate of heating of the adsorbing and catalytic regions can be adjusted optimally for a given mass flow and a given temperature of the exhaust gas. As explained above, this can be done by selecting the material properties of the support in the adsorbing and catalyzing regions.

In order to achieve a short heating phase and, with that, a small volume for the adsorbing region, the density and the specific heat capacity of the support for the adsorbing region as well as of the support for the region of catalytic activity should be low. The volume, selected for the adsorbing region, must be sufficiently large so that the amount of hydrocarbons, arising from the exhaust gas stream supplied by the internal combustion engine, can be adsorbed before the light-off temperature of the downstream catalyst is attained. The volume of the region of catalytic activity must be sufficiently large so that complete conversion of the materials, contained in the exhaust gas stream, is possible at any operating point of the internal combustion engine.

In addition, the temperature distribution in the support material, which is affected by the thermal conductivity of the support material, can also be taken into consideration. A high thermal conductivity favors a more uniform distribution of temperatures in the axial direction more so than does a low thermal conductivity. Accordingly, a high thermal conductivity is advantageous for the adsorbing region, since temperature peaks can be dissipated by it and, with that, the start of the desorption can be delayed.

The available surfaces and the masses to be heated are to be considered as further parameters affecting the heating time. Supports with a smaller mass and a large surface area shorten the heating time, while supports with a larger mass and a small surface area prolong the heating time.

Finally, aside from the temperature, it is also possible to take the concentration of the material to be adsorbed (hydrocarbons here) from the exhaust gas into consideration for the absorption. A low support temperature in the adsorbing region and high hydrocarbon concentrations are advantageous for a high adsorption of hydrocarbons. On the other hand, a high support temperature in the adsorbing region and a low hydrocarbon concentration are advantageous for the desorption.

It is furthermore proposed that the depth of the individual zones be selected so that a matrix temperature at the inlet of a zone of catalytic activity already lies above the light-off temperature when the matrix temperature at the outlet of the upstream adsorbing zone is still below the desorption temperature.

It is also advantageous to provide a zone of catalytic activity as the last zone. By this measure, it is ensured that the components of the exhaust gas, emerging from the last adsorbing zone (as seen in the flow direction), are also reacted and cannot emerge from the adsorbent-catalyst combination.

Furthermore, it is proposed that the adsorbent-catalyst combination be built up as a stack of disks of support material, which have the same external diameter, an optionally different length and are coated alternatively so as to have an adsorbing action or a catalytic action. Known supports, such as metallic or ceramic supports or combinations thereof, can be used for this construction. The disks can follow one another with or without an interval. Moreover, with this construction, it is possible to standardize the individual components of the combination and, by the number of supporting disks used, adapt them to the volume of catalytic or adsorbing material required for the purification of the exhaust gases. The manufacturing costs can be clearly lowered by this standardization.

The invention can be used not only for the combination of adsorbing zones and zones of catalytic activity, but explicitly also for the combination of zones, which are both adsorbing and have catalytic activity with downstream zones having catalytic activity.

Other objects, advantages and novel features of the present invention will become apparent from the following detailed description of the invention when considered in conjunction with the accompanying drawings.

DETAILED DESCRIPTION OF THE DRAWINGS

Figure 1:
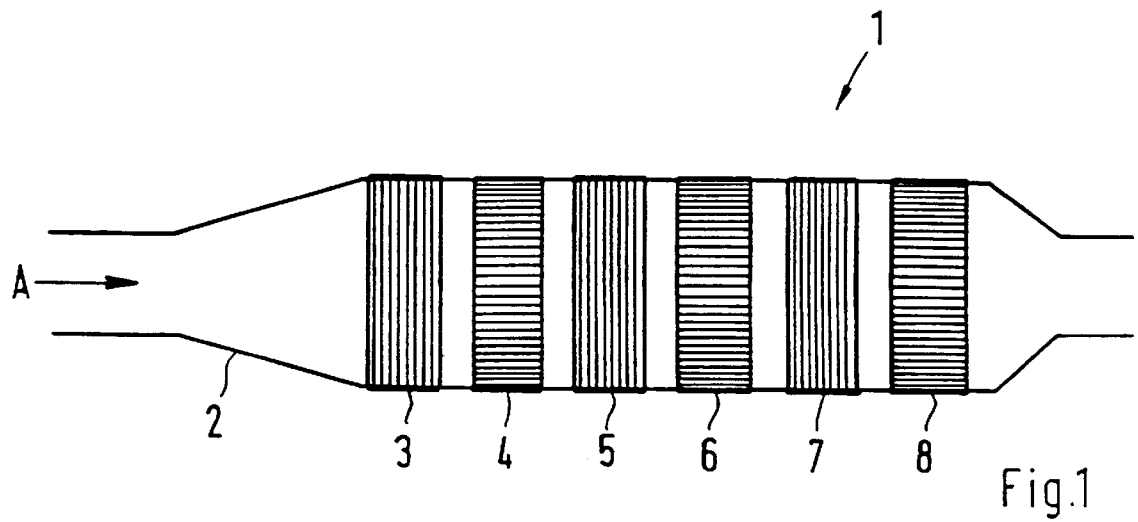
FIG. 1 shows a section through an adsorbent-catalyst combination according to a preferred embodiment of the present invention.

An adsorbent-catalyst combination, labeled 1, is disposed downstream from an internal combustion engine, which is not shown, in the exhaust line of this engine. The exhaust gas flows through the adsorbent-catalyst combination 1 in the direction indicated by arrow A. The adsorbent-catalyst combination 1 consists of a housing 2, in which support disks 3 to 8 are held. With respect to their external geometric dimensions, the support disks 3 to 8 are constructed identically with the exception of the length in the flow direction A and differ in the coating applied on the support disks. Support disks 3, 5 and 7 are coated with an adsorbing material, while support disks 4, 6 and 8 are coated with a material having catalytic activity. The desorption temperature of the adsorbing material used lies slightly below the light-off point of the material of catalytic activity used.

The support disks 3 to 8 are alternately disposed so that, in the flow direction A, a support disk having catalytic activity follows an adsorbing support disk. Support disk 3, which is the first disk as seen in the flow direction A, is coated with an adsorbing material while support disk 8, which is the last disk as seen in the flow direction A, is coated with a material having catalytic activity.

Figure 2:
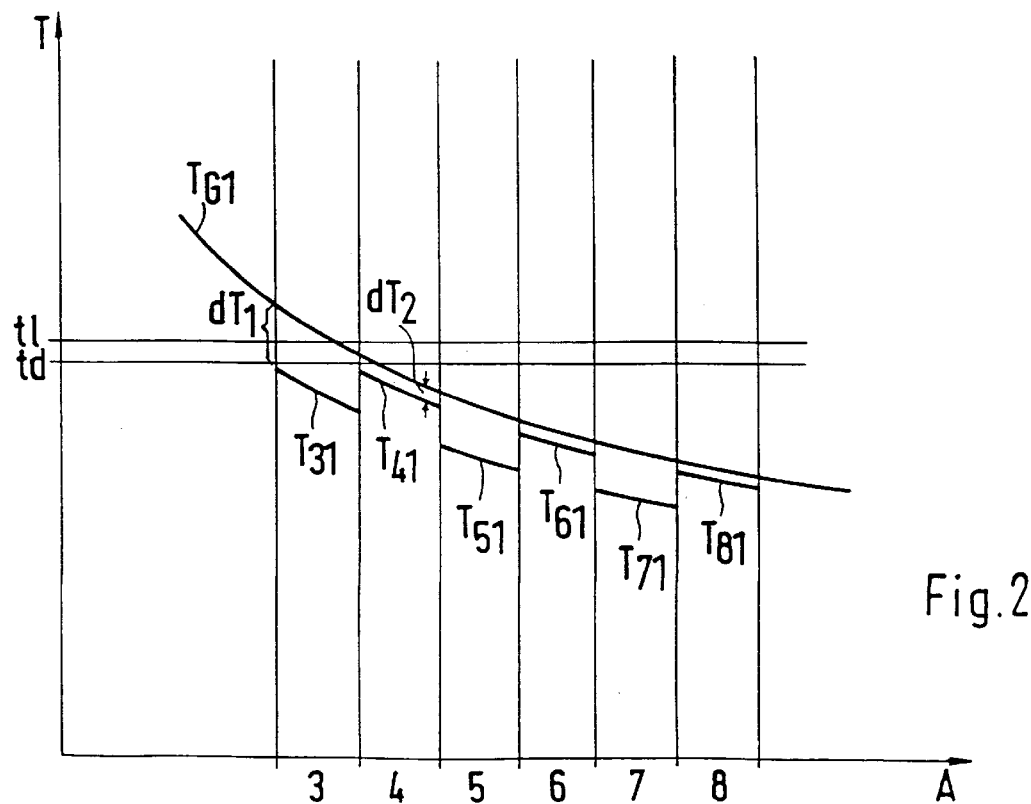
FIG. 2 shows a temperature diagram representing the temperature distribution within the adsorbent-catalyst combination at a time before the desorption temperature and the light-off temperature are reached, shortly after a cold start of an internal combustion engine.
Figure 3:
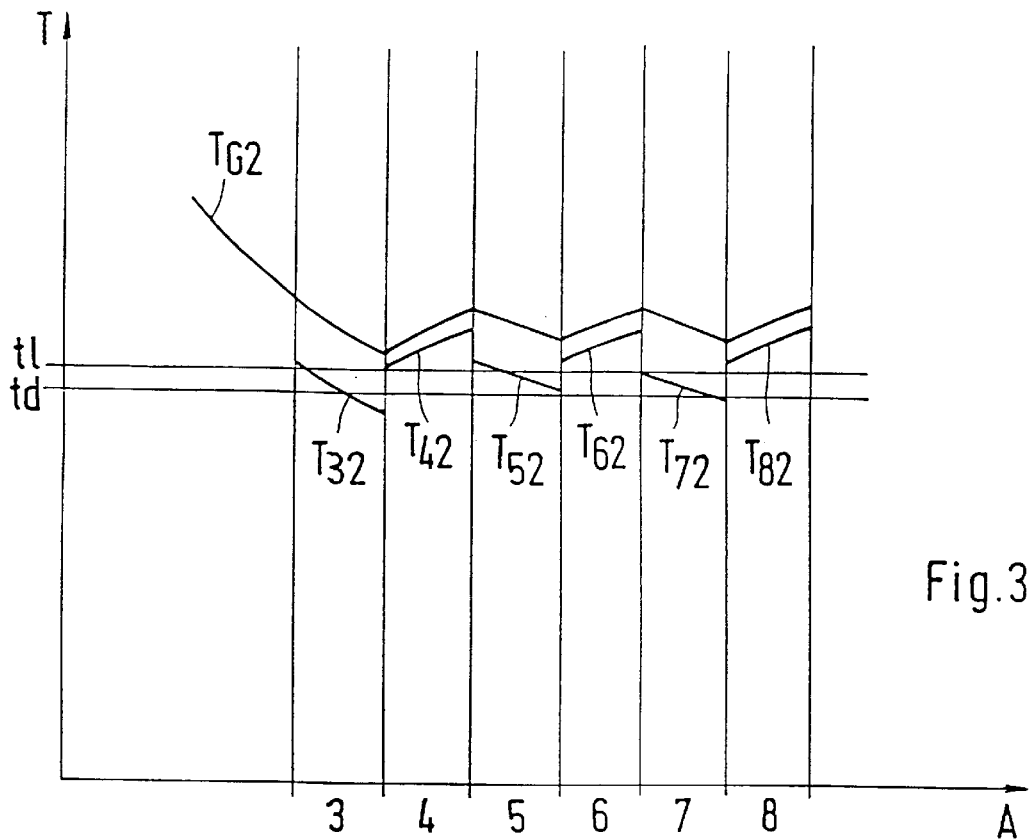
FIG. 3 shows a temperature diagram representing the temperature distribution within the adsorbent-catalyst combination at a time of time after the desorption temperature and the light-off temperature are reached, after the cold start of an internal combustion engine.

In FIGS. 2 and 3, exhaust gas temperatures $T_{Gj}$ and matrix temperature $T_{ij}$ of the support disks 3 to 8 are shown at different times j=1, 2 for the arrangement of support disks 3 to 8 shown in FIG. 1.

The effect of this arrangement of support disks 3 to 8 is explained in greater detail by means of the temperature diagram shown in FIG. 2. For this purpose, the temperature T in the center of the support in the adsorbent-catalyst combination 1 in the flow direction A, before a desorption temperature td and a light-off temperature tl are reached shortly after the cold start of internal combustion engine, is shown in FIG. 2. The portions of the path, which the exhaust gas covers within the individual support disks 3 to 8, are characterized here in the flow direction A. The temperature of the exhaust gas stream is labeled $T_{Gj}$, while the matrix temperatures $T_{ij}$ of the individual regions are characterized by the reference symbols of the associated support disks 3 to 8, that is i=3 . . . 8. The temperature situation, shown in FIG. 2, comes about shortly after the cold start of the internal combustion engine. In other words, a certain heating of the support disks 3 to 8 has already taken place. The light-off temperature tl of the support disks 4, 6 and 8, having catalytic activity, as well as the desorption temperature td of the support disks 3, 5 and 7, coated with adsorbing material, are also recorded, the desorption temperature td being slightly below the light-off temperature tl.

At the time j=1 shown, none of the support disks 3 to 8 has exceeded the desorption temperature td or the light-off temperature tl.

The support disks 3, 5 and 7, coated with adsorbing material, have a lower heat transfer than do the support disks 4, 6 and 8, which have been coated with catalytic material. For this purpose, primarily the support disks 3, 5 and 7, coated with adsorbing material, were designed so that they have a lower cell density than do the support disks 4, 6 and 8, coated with catalytic material. Due to the lower cell density, the surface area of the support disks 3, 5 and 7 is smaller than that of the support disks 4, 6 and 8. During the first measurements, it was noted that the difference $dT_1$, between the temperature of the exhaust gas stream $T_G$ and the matrix temperature $T_3$ of a support disk 3 with a low cell density was clearly greater than the difference $dT_2$ between the temperature of the exhaust gas stream $T_G$ and that of the matrix temperature $T_4$ of a support disk 4 with a high cell density in the region.

Figure 5:
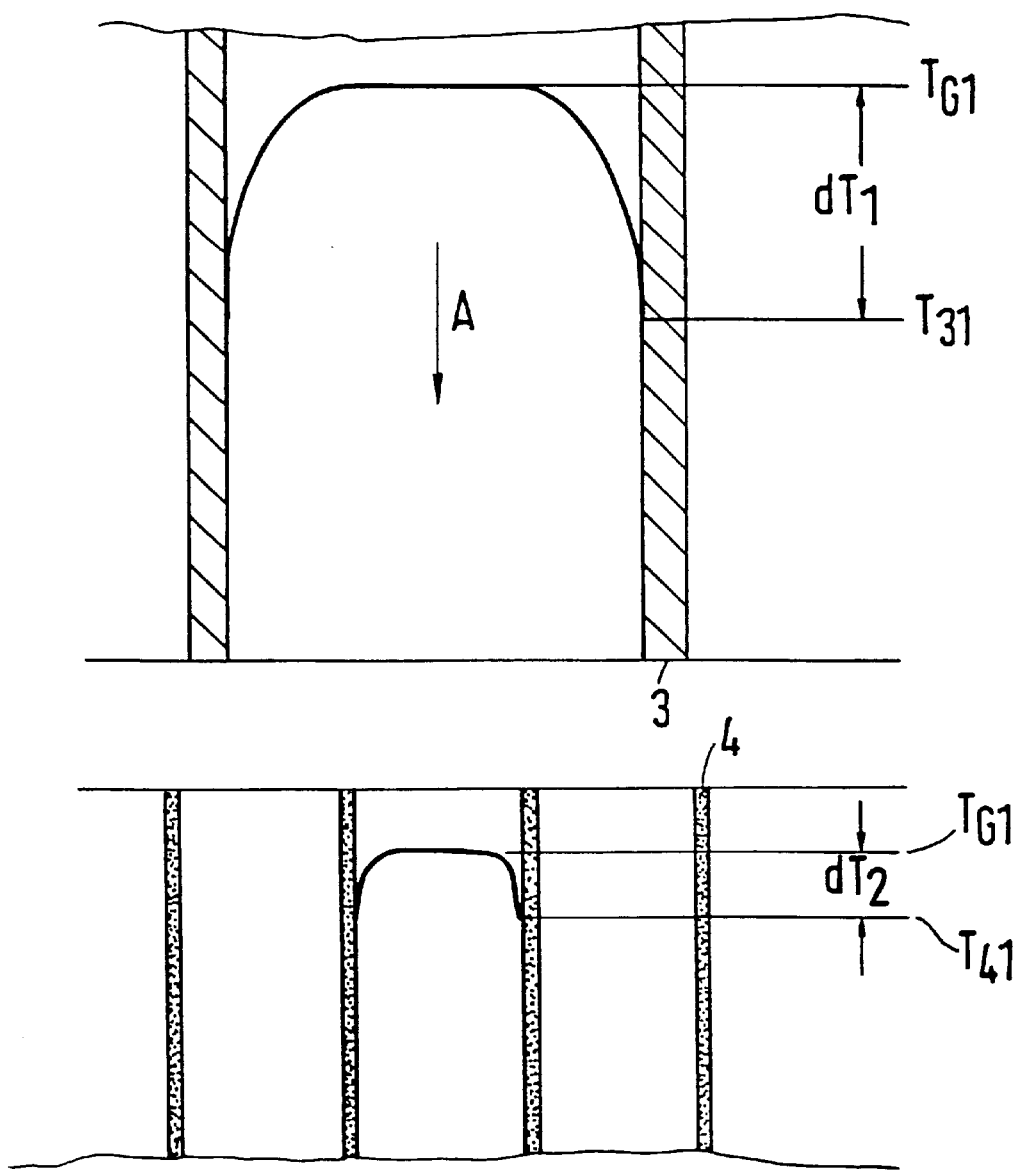
FIG. 5 shows a diagram representing the temperature distribution through the first two support disk 3 and 4 of the adsorbent-catalyst combination of FIG. 1.

In FIG. 5, the effect of these measures is shown by means of a temperature distribution in a section through the first two support disks 3 and 4. On the flow path in the flow direction A through the first support disk 3, a large temperature difference $dT_1$, arises between the temperature of the exhaust gas stream TG and that of the matrix $T_3$. The first support disk 3 is made, for example, from a metallic material and has large cells, that is, a low cell density. On the flow path through the second support disk 4, which is made, for example, from a ceramic material and has small cells, that is, a high cell density, there is a lesser temperature difference $dT_2$ between the temperature of the exhaust gas stream $T_G$ and the temperature of the matrix $T_4$. The difference between the first temperature difference $dT_1$ and the second temperature difference $dT_2$ can be more than 50° C.

As can be seen clearly in FIG. 2, the matrix temperature of the supporting disks 3, 5 and 7, coated with adsorbing material, as a result of the measures for the design of the supporting disks 3 to 8, is less, at least in partial regions, than the matrix temperature of the, in each case, following support disks 4, 6 or 8, which are coated with catalytic material.

FIG. 3 illustrates the course of the temperatures of the exhaust gas and the matrix with increasing heating at a time, after the desorption temperature td and the light-off temperature tl are reached. At the time j=2 under consideration, the desorption temperature td is reached in the region of the first supporting disk 3, coated with adsorbing material, and the light-off temperature tl is reached in the next supporting disk 4, which has catalytic activity. Due to the catalytic conversion and the exothermic reaction, the exhaust gas temperature, in the region of the support disk 4 having catalytic activity, increases proportionally to the matrix temperature $T_{42}$. The higher outlet temperature at the support disk 4, having catalytic activity, brings about a corresponding increase in temperature $T_{52}$ in the following support disk 5, having adsorbing activity, to a temperature above the desorption temperature td. With this, the outlet temperature of the support disk 5, having adsorbent activity, also increases further and the temperature $T_{62}$ in the subsequent support disk 6, having catalytic activity, exceeds the light-off temperature tl, so that the catalytic conversion with the corresponding further increase in temperature is also initiated here. This process proceeds similarly in supports disks 7 and 8.

Figure 4:
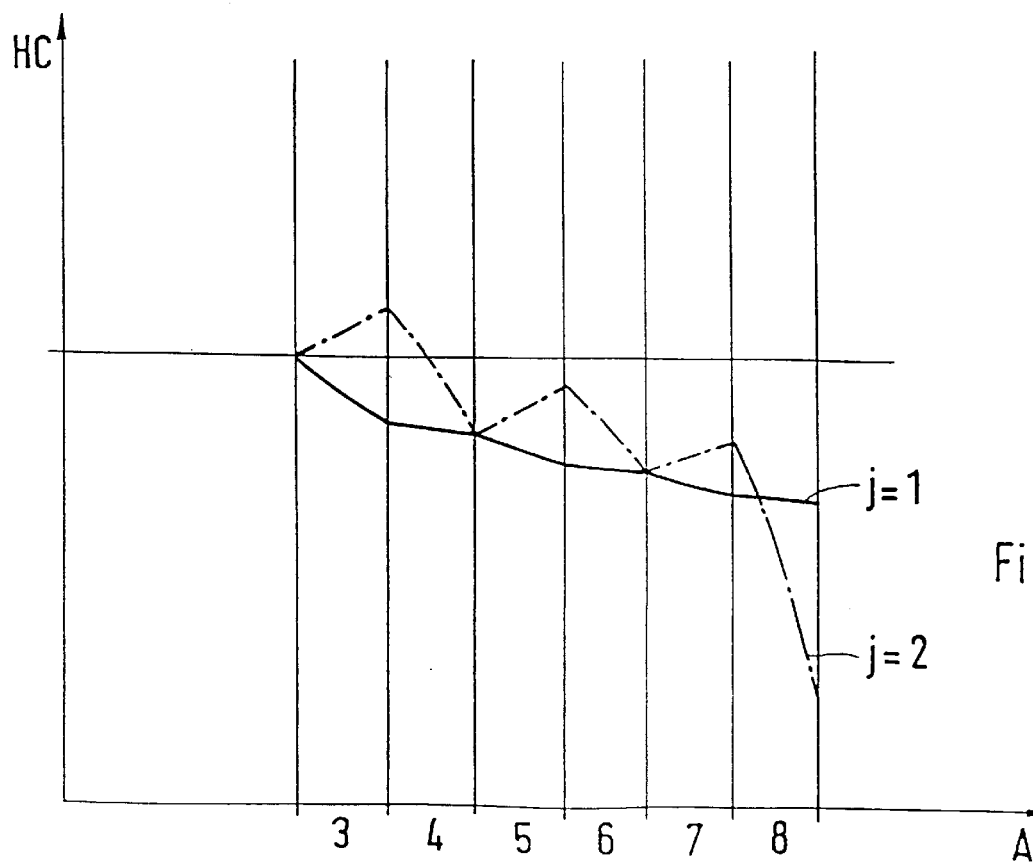
FIG. 4 shows a diagram representing the concentration of hydrocarbons within the adsorbent-catalyst combination for the times shown in FIGS. 1 and 2, after the cold start of an internal combustion engine.

FIG. 4 illustrates the course of the concentration of hydrocarbons parallel to the temperature variations shown in FIG. 3. At time j=1, hydrocarbons are adsorbed in the support disks 3, 5 and 7, having adsorbing activity. With that, the hydrocarbon concentration decreases steadily over the length of the support disks 3, 5 and 7, having adsorbing activity. In the region of the support disks 4, 6 and 8, having catalytic activity, the hydrocarbon concentration remains essentially constant. If the desorption temperature td is reached at time j=2, there is, as a result of desorption, an increase in concentration in the region of the first support disk 3, having adsorbing activity. At this time j=2, the first support disk 4, having catalytic activity, has exceeded its light-off temperature tl and thus decreases the hydrocarbon concentration. The subsequent support disk 5, coated with adsorbing material, also desorbs hydrocarbons, since its temperature $T_{52}$ is above the desorption temperature td. As a result, the hydrocarbon concentration increases in the course of this support disk 5. The subsequent support disk 6, having catalytic activity, decreases the increased concentration once again because of the catalytic conversion taking place here. These processes of desorption and catalytic conversion take place similarly in support disks 7 and 8.

In accordance with the explanation, there is essentially complete conversion of hydrocarbons in the last support disk 8, having catalytic activity, while the first two support disks 4 and 6, having catalytic activity, are designed so that the hydrocarbons are converted only to approximately the concentration, which existed before entry into the subsequent support disk 5 and 7 respectively, having adsorbent activity. By this measure, it is prevented that, due to too low a hydrocarbon concentration at the inlet at the second and third support disks 5 and 7, having adsorbent activity, desorption is initiated already when the temperature in the respectively subsequent support disk, having catalytic activity, would not yet be adequate for a catalytic conversion.

As can be seen clearly from FIGS. 2, 3 and 4, penetration by components of the exhaust gas through the adsorbent-catalyst combination 1 is largely avoided with the inventive arrangement due to an appropriate selection of the depth of the zones formed by the individual support disks 3 to 8 since, because of the temperature differences between the support disks 3, 5 and 7, coated with adsorbing material, and the support disks 4, 6 and 8, coated with catalytic material, the desorption commences only when the support disk, coated with catalytic material and following the desorbing support disk, is already catalytically active.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adsorber-catalyst combination for an internal combustion engine, comprising:

a housing defining an engine exhaust flow path, at least one adsorber arranged in the housing in the exhaust flow path, and at least one catalyst arranged in the housing in the exhaust flow path, wherein said at least one adsorber and said at least one catalyst are arranged in series alternately along said exhaust flow path, and wherein the at least one adsorber exhibits at least one of lower heat transfer characteristics and higher heat capacity characteristics as compared to corresponding characteristics of an adjacent downstream one of said at least one catalysts.

2. An adsorber-catalyst combination according to claim 1, wherein the at least one adsorber includes a plurality of adsorbers, and wherein the at least one catalyst includes a plurality of catalysts corresponding in number to the plurality of adsorbers.

3. An adsorber-catalyst combination according to claim 2, wherein the adsorbers have a lower cell density and a smoother surface than the catalysts.

4. An adsorber-catalyst combination according to claim 3, wherein the adsorbers have a higher thermal conductivity than the catalysts.

5. An adsorber-catalyst combination according to claim 2, wherein a depth in the direction of exhaust gas flow for the adsorbers and catalysts is selected to assure that a temperature at an inlet of a catalyst is above the light-off temperature while the temperature at an outlet of an upstream adsorber is still below the desorption temperature.

6. An adsorber-catalyst combination according to claim 1, wherein one of said at least one catalyst is provided at a downstream end of the adsorber-catalyst combination.

7. An adsorber-catalyst combination in accordance with claim 2, wherein at least some of the adsorbers are additionally suitably coated with a catalytically active material.

8. An adsorber-catalyst combination in accordance with claim 2, wherein both the adsorbers and catalysts are in the form of disk-carrier members which have similar outside cross-sectional dimensions, wherein the adsorbers are coated with an active adsorbing coating and the catalysts are coated with an active catalytic coating.

9. An adsorber-catalyst combination in accordance with claim 8, wherein said disk-carrier members are arranged in a stack.

10. An adsorber-catalyst combination in accordance with claim 2, wherein the adsorbers have at least one of a greater wall thickness, a lower cell density, and a higher thermal capacity than the catalysts.

11. An adsorber-catalyst combination in accordance with claim 2, wherein said adsorbers and catalysts are configured to minimize their respective warm-up times when exposed to exhaust gas flow.

12. An adsorber-catalyst combination in accordance with claim 2, wherein the adsorbers have a desorption temperature, and the catalysts have a light-off temperature, and wherein an exhaust flow depth of the adsorbers and catalysts is selected such that a temperature at an inlet of said catalyst is above the respective light-off temperature, and wherein the temperature at an outlet of an upstream one of the adsorbers is below the adsorption temperature.

13. An adsorber-catalyst combination in accordance with claim 2, wherein, the absorbers and the catalysts are configured so that in an in use position with an exhaust gas stream flowing therethrough, a temperature difference between the adsorbers and the exhaust gas stream therethrough is greater than a temperature difference between the catalysts and the exhaust gas stream therethrough.

14. An adsorber-catalyst combination in accordance with claim 2, wherein the adsorbers have a desorption temperature and the catalyst have a light-off temperature and wherein, the absorbers and the catalysts are configured so that when a temperature of at least a portion of one of the adsorbers exceeds said desorption temperature, an inlet temperature of a downstream adjacent one of the catalysts exceeds said light-off temperature.

15. A method of manufacturing an adsorbent-catalyst combination for an internal combustion engine, comprising:

providing a housing defining a flow path to be communicated with an exhaust stream of the internal combustion engine;

providing at least one adsorber;

providing at least one catalyst; and arranging said at least one absorber and said at least one catalyst alternately along said flow path of the housings, wherein the at least one adsorber exhibits at least one of lower heat transfer characteristics and higher heat capacity characteristics as compared to corresponding characteristics of an adjacent downstream one of said at least one catalyst.

16. A method according to claim 15, wherein a temperature difference between the adsorbers and the exhaust gas stream therein is greater than a temperature difference between the catalysts and the exhaust gas stream therein.

17. A method according to claim 15, wherein the adsorbers have a desorption temperature, and the catalysts have a light-off temperature, and wherein when a temperature of at least a portion of one of the adsorbers exceeds said desorption temperature, an inlet temperature of a downstream adjacent one of the catalysts exceeds said light-off temperature.

* * * * *